US007929702B2

(12) United States Patent
Brown et al.

(10) Patent No.: US 7,929,702 B2
(45) Date of Patent: Apr. 19, 2011

(54) SYSTEM AND METHOD FOR GENERATING REPRODUCIBLE SESSION KEYS

(75) Inventors: Michael K. Brown, Kitchener (CA);
Michael S. Brown, Waterloo (CA);
Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1318 days.

(21) Appl. No.: 11/058,259

(22) Filed: Feb. 16, 2005

(65) Prior Publication Data
US 2005/0254658 A1   Nov. 17, 2005

Related U.S. Application Data

(60) Provisional application No. 60/567,611, filed on May 3, 2004.

(51) Int. Cl.
*H04L 9/00* (2006.01)
(52) U.S. Cl. ............ 380/277; 380/37; 380/44; 455/410; 713/150
(58) Field of Classification Search .................. 709/230, 709/236
See application file for complete search history.

(56) References Cited

U.S. PATENT DOCUMENTS

| | | | | |
|---|---|---|---|---|
| 4,864,615 A | * | 9/1989 | Bennett et al. | 380/239 |
| 5,481,613 A | * | 1/1996 | Ford et al. | 380/30 |
| 5,608,801 A | * | 3/1997 | Aiello et al. | 380/46 |
| 6,289,105 B1 | * | 9/2001 | Murota | |
| 6,529,602 B1 | * | 3/2003 | Walker et al. | 380/283 |
| 6,931,549 B1 | * | 8/2005 | Ananda | 726/26 |
| 7,062,490 B2 | * | 6/2006 | Adya et al. | 1/1 |
| 2002/0076054 A1 | * | 6/2002 | Fukutomi et al. | |
| 2003/0112977 A1 | * | 6/2003 | Ray et al. | |
| 2003/0172278 A1 | * | 9/2003 | Farnham et al. | |
| 2004/0205248 A1 | * | 10/2004 | Little et al. | 709/246 |

FOREIGN PATENT DOCUMENTS

| | | | |
|---|---|---|---|
| JP | 9-46330 A | | 2/1997 |
| JP | 11-327437 A | | 11/1999 |
| JP | 2004-5174 | * | 5/2002 |
| JP | 2002358226 A | * | 12/2002 |
| JP | 2004-005174 A | | 1/2004 |
| WO | 03/007570 A1 | * | 1/2003 |
| WO | 03/088571 A1 | | 10/2003 |

OTHER PUBLICATIONS

PTO 09-1510, "Serverless Distributed File System", pp. 1-100.*
JPO Decision of Refusal for application JP2006-545858, dated Feb. 23, 2010, 3 pages.*
David J. Kappos, "Subject Matter Eligibility of Computer Readable Media", Jan. 26, 2010, 1 page.*
Machine translation of JP 2004-5174, printed Jun. 18, 2010, 39 pages.*

* cited by examiner

*Primary Examiner* — Ponnoreay Pich
(74) *Attorney, Agent, or Firm* — Dimock Stratton LLP; Mark Eisen; Alan Macek

(57) ABSTRACT

A system and method for generating reproducible session keys in a wireless messaging system. The session key is generated based on a hash of a message itself, optionally concatenated with additional information. Since the local server stores the message, it can easily regenerate the same session key in response to each MORE request. The method of the invention can be implemented with the stored original message, a public key, and an algorithm for generating the session key based on a hash of the message.

21 Claims, 2 Drawing Sheets

SYSTEM AND METHOD FOR GENERATING REPRODUCIBLE SESSION KEYS

FIELD OF THE INVENTION

This invention relates to wireless communications devices. In particular, this invention relates to a system and method for generating session keys for secure communications between a mobile communication device and a network server or gateway.

BACKGROUND OF THE INVENTION

Wireless mobile communication devices, which can communicate via one or more of email, phone, SMS messaging, Internet and intranet-based applications, are widely used in business and personal applications. These include self-contained devices, and wireless modems which can be integrated into portable computers. In a typical business environment with multiple users, a plurality of mobile communication devices communicate through a local server, which manages communications traffic and relays communications signals to a telecommunications carrier.

Security is a major concern in such wireless communications systems. Accordingly, the local server encrypts all messages before transmission to a mobile communication device, and encrypted messages transmitted to the mobile communication device are decrypted by suitable software or hardware in the mobile communication device.

The encryption and decryption processes typically operate using a "public key" infrastructure in which a trusted third party certifies the authenticity of the public/private key pair generated by a user. The public key is used to encrypt messages and verify digital signatures while the private key is used to decrypt messages and digitally sign documents. This combination of public and private keys, commonly known as "asymmetric cryptography," can be used to effectively encrypt messages and create digital signatures, as is well known to those skilled in the art. The wireless component of the communications system is thus secured, so that if the wireless signal is intercepted by a malicious attacker, it cannot be decrypted.

To maximize security in the mobile communications system, a session key is generated each time the user's mobile communication device requests the transfer of a message from the local server to the mobile communication device. The mobile communication device may encrypt a 'signed only' message to generate a link between the local server and the mobile communication device at the commencement of each message transfer session, and as part of this process the session key is generated and encrypted with the user's public key.

Memory in the mobile communication device is at a premium, and sometimes messages are too large to conveniently download the entire message to the mobile communication device. Accordingly, the local server typically sends batches or blocks (for example 2 KB) of data to the mobile communication device at one time. For some messages, the first block will include the entire message and the session thus ends as the message transmission is completed. But for larger messages, the remainder of the message data is held back from the mobile communication device until a MORE request for further message data is transmitted to the local server. For example, when the user scrolls down the message to the point where the mobile communication device nears the end of the downloaded block of data, the device automatically sends a MORE request to the local server. Upon receiving a MORE request, the next block of data in the message is transmitted to the mobile communication device.

Whenever a MORE request is received from the mobile communication device, in order to prevent errors in the decrypted message the local server needs to encrypt the next block of data with the same session key as used for the previous block(s) of data. However, it is not desirable to store the session key in the local server, both because this uses additional memory unnecessarily, and because it is advantageous to limit the amount of secret information that must be stored on the local server.

It would accordingly be advantageous to provide a method of creating a secure, reproducible session key and a system utilizing such a method.

SUMMARY OF THE INVENTION

The present invention provides a system and method for generating reproducible session keys.

According to the invention, the session key is generated based at least in part on a hash of the message itself. Since the local server stores the message at least until the session is complete, it can then easily regenerate the same session key in response to each MORE request.

In the preferred embodiment additional data is added to the hash to ensure that it is unique. The additional data could for example be the email address of the user, some random bytes stored in the local server, or an increasing counter (so that, for example if the same message is sent to the user multiple times, the session key will be different each time). If no additional data is used, the session key is generated based solely on a hash of the message itself.

The present invention accordingly provides a system and method for generating a reproducible session key. Moreover the method of the invention can be implemented with only the stored original message, the public key, and an algorithm for generating the session key based on a hash of the message.

The present invention thus provides a method of generating a reproducible session key for encrypting data in a data item for transmission to a remote communication device during a session, wherein if the data item exceeds a selected batch size a plurality of batches of data are transmitted during the session and encrypted with the same session key, comprising the steps of: a. storing the data item in at least one memory addressable by a data processing device, and b. applying a deterministic algorithm to all or a portion of the data item to generate a hash of the data item for use as a unique session key associated with the data item.

The present invention further provides a system for generating a reproducible session key for encrypting data in a data item for transmission to a remote communication device during a session, wherein if the data item exceeds a selected batch size a plurality of batches of data are transmitted during the session and encrypted with the same session key, comprising a data processing device in communication with at least one memory for storing the data item and comprising a processor for applying a deterministic algorithm to all or a portion of the data item to generate a hash of the data item for use as a unique session key associated with the data item.

The present invention further provides a computer program product for use with a computer, the computer program product comprising a computer usable medium having computer readable program code means embodied in said medium for generating a reproducible session key for encrypting message data, said computer program product having a. computer readable program code means for reading the data item from at least one memory, and b. computer readable program code means for applying a deterministic algorithm to all or a portion of the data item to generate a hash of the data item for use as a unique session key associated with the data item.

BRIEF DESCRIPTION OF THE DRAWINGS

In drawings which illustrate by way of example only a preferred embodiment of the invention.

DETAILED DESCRIPTION OF THE INVENTION

Figure 1:
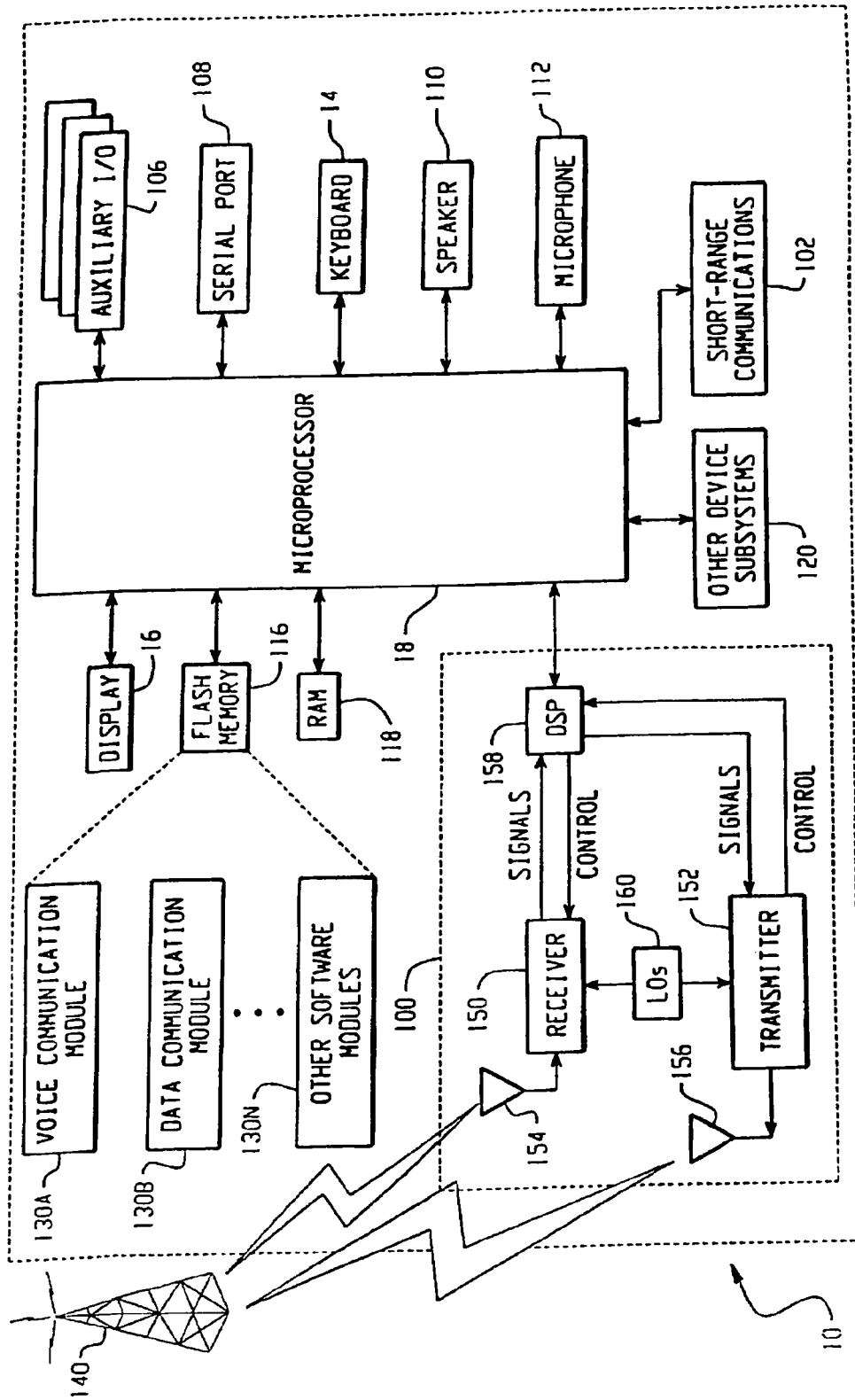
FIG. 1 is a block diagram of a system overview of a conventional hand-held mobile communication device.

The system and method of the invention will be described in detail below, by way of example only, in the context of a remote communication device such as the hand-held mobile communication device 10 illustrated in FIG. 1. Such hand-held mobile communication devices 10, are well known to those skilled in the art. However, it will be appreciated that the principles of the invention apply to other wireless communications devices and the system is not intended to be limited thereby. It will also be appreciated that the invention is not limited by the particular method of communication used (e.g. email, phone, SMS, MMS etc.).

In general, the hand-held mobile communication device 10 includes a housing, a keyboard 14 and an output device 16. The output device shown is a display 16, which is preferably a full graphic LCD. Other types of output devices may alternatively be utilized. A processor 18, which is shown schematically in FIG. 1, is contained within the housing and is coupled between the keyboard 14 and the display 16. The processor 18 controls the operation of the display 16, as well as the overall operation of the mobile device 10, in response to actuation of keys on the keyboard 14 by the user.

The housing may be elongated vertically, or may take on other sizes and shapes (including clamshell housing structures). The keyboard 14 may include a mode selection key, or other hardware or software for switching between text entry and telephony entry.

In addition to the processor 18, other parts of the mobile device 10 are shown schematically in FIG. 1. These include a communications subsystem 100; a short-range communications subsystem; the keyboard 14 and the display 16, along with other input/output devices 106, 108, 110 and 112; as well as memory devices 116, 118 and various other device subsystems 120. The mobile device 10 is preferably a two-way RF communication device having voice and data communication capabilities. In addition, the mobile device 10 preferably has the capability to communicate with other computer systems via the Internet.

Operating system software executed by the processor 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile device may also be stored to the RAM 118.

The processor 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, a mobile device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processor 18. The received signal is then further processed by the processor 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100. Each data item is transmitted over the communication network 140 in an encrypted form during a "session," which involves transmitting one or more batches of data until the data item has been completely transmitted to the device 10. In the preferred embodiment the data transmitted during each such session is encrypted using a common "session key," as described in detail below.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

The invention applies to the transmission of data items, for example email messages, over the communication network 140. For efficient operation of the network 140 the data items are transmitted in batches of data, for example in 2 kb batches (although any suitable batch size may be selected), until the entire message has been transmitted to the device 10, known as a "session." For security purposes, the data item is transmitted in an encrypted form during the session.

According to the invention, a deterministic algorithm is employed to generate a hash of the message. In general terms, a hash is the result of processing a batch of data with a compression function that takes the batch of data and compresses it down to a smaller, unique identifier.

In the preferred embodiment of the method, a deterministic algorithm, for example a hash algorithm (such as, for example, SHA-256 as defined in Federal Information Processing Standards (FIPS) publication 180-2 published Aug. 1, 2002, which is incorporated herein by reference) or a key derivation function (a generic construction that uses a hash algorithm, along with other data, to repeatedly hash data to produce a key of a specified length) is applied to the message m to be encrypted. By way of example only, the implementation of the invention will be described using SHA-256 as the hash algorithm H(), which provides a 256 bit output and accordingly works well when using Advanced Encryption Standard (AES) to encrypt the message m. The hash of a message m will herein be represented by H(m).

The session key is generated based at least in part on the hash of the message. It is possible to generate the session key based solely on a hash of the message itself, however in the preferred embodiment additional data is added to the hash to ensure that it is unique so that, for example, if the same message is sent twice the two different sessions will have different session keys. The preferred embodiment of the invention thus allows for the option of utilizing additional information r which is added to the message m to ensure that the hash is unique. The additional data r could for example be the email address of the user, randomly generated bytes stored on the local server, or an incremental counter. In alternate embodiments, a hash of additional data r may be combined with the hash of the message m. It will be appreciated that there are different ways in which to make use of additional data r. Since the use of additional data r is optional, r could also be empty.

A malicious attacker who wants to decrypt the message must determine the session key. To do this, the attacker would have to read the original message, which cannot be done without the session key since the original message is encrypted with the session key, or decrypt the session key, which cannot be done because the session key is encrypted with the user's public key and the malicious attacker does not have access to the corresponding private key.

The session key k is created by a hash of the concatenation ($\|$) of m and r, expressed as $k=H(m\|r)$. Where r is empty, i.e. the session key k is created from the contents of the message m only, this can be expressed as $k=H(m)$.

Then the session key k is encrypted using the user's public key p, which could for example be an RSA key, by an operation $E_p(k)$ to produce the encrypted session key $e_k=E_p(k)$.

The message m (or a batch of data from the message m if the message m is larger than the selected batch size) is encrypted using the session key k, for example using AES, so the encrypted message $e_m$, becomes $e_m=E_k(m)$. The encrypted session key $e_k$ and the encrypted message $e_m$ are sent to the user's mobile communication device 10, which can then decrypt the session key in conventional fashion using the private key that corresponds to public key p, and then thus decrypt the message data using the session key. The session key may be stored on the mobile device 10 for the duration of the session.

Figure 2:
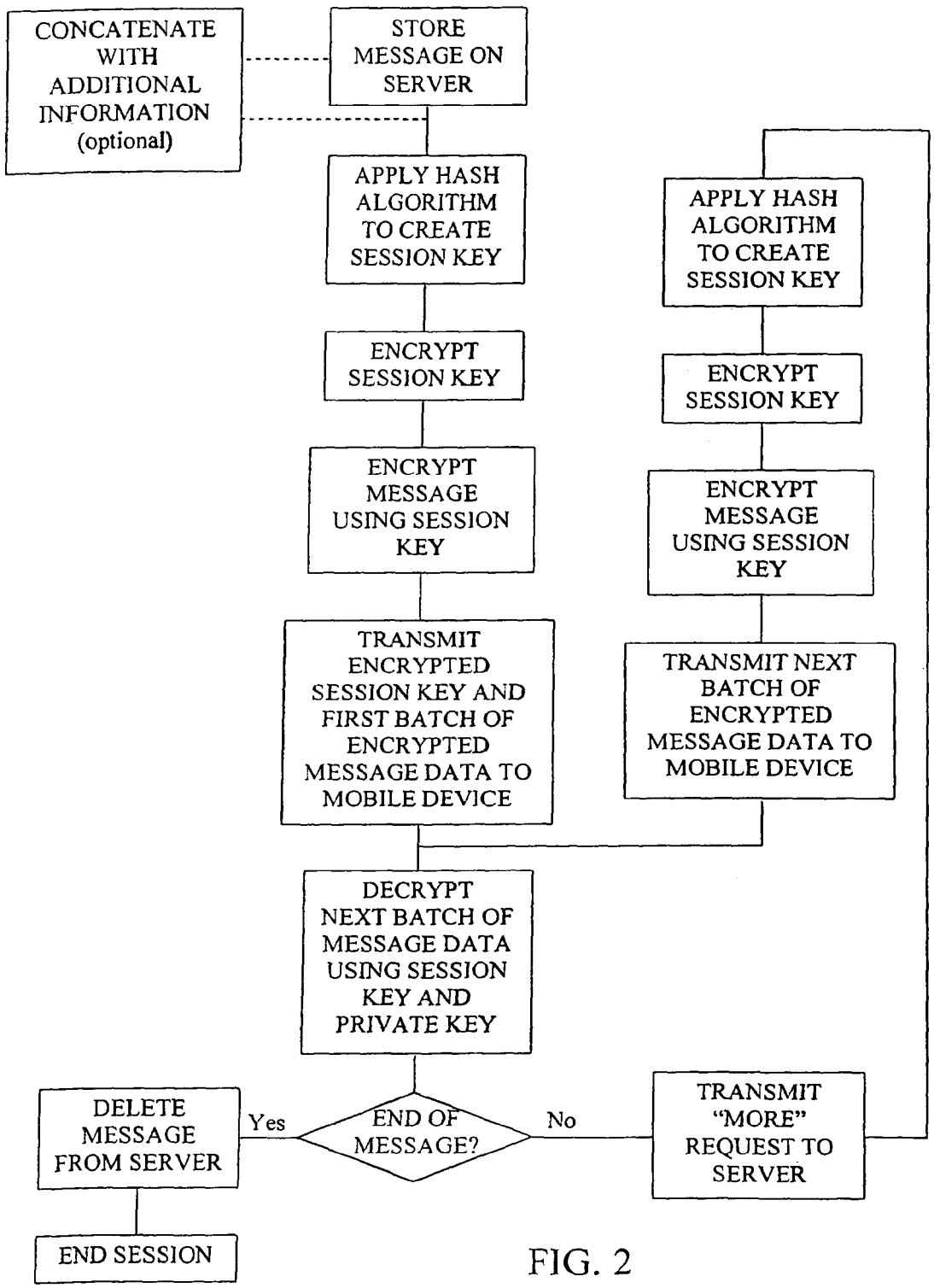
FIG. 2 is a flow chart illustrating a method of encrypting and decrypting a message using the method of the invention.

As shown in FIG. 2, if the message is contained entirely within the first batch of data, the session is complete. If the first batch of message data does not contain the entirety of the message, the mobile communication device 10 transmits a MORE request to the local server, for example as the user scrolls down the message toward the end of the first batch of message data. The process described above is then repeated for the next batch of message data. The local server recreates the session key from the hash of the message data (and optionally external data r, if used), re-encrypts the session key using the public key to recreate the encrypted session key, encrypts the next batch of message data using the same session key, and transmits the next batch of encrypted message data to the mobile device 10 in the same fashion.

It will be appreciated that the principles of the invention may be applied irrespective of the communications method employed, and the encryption platform and public key system is a matter of choice.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A method of generating a reproducible encryption key for encrypting data associated with a data item for transmission to a remote communication device, comprising:

applying a deterministic algorithm to at least a portion of the data item to generate a first hash, the data item exceeding a selected batch size, using the first hash as an encryption key to encrypt a first batch of the data associated with the data item, transmitting the encrypted first batch of the data associated with the data item to the remote communication device, applying the deterministic algorithm to at least a portion of the data item to generate a further hash whereby the further hash is identical to the first hash, using the further hash as an encryption key to encrypt a further batch of the data associated with the data item, and transmitting the encrypted further batch of the data associated with the data item to the remote communication device.

2. The method of claim 1 wherein the deterministic algorithm comprises a hash algorithm.

3. The method of claim 1 wherein the deterministic algorithm comprises a key derivation function.

4. The method of claim 1 further comprising concatenating the portion of the data item with additional data prior to applying the deterministic algorithm.

5. The method of claim 4 wherein the additional data is from a source external to the data item.

6. The method of claim 1 further comprising, after using the first hash as an encryption key to encrypt the first batch of the data associated with the data item, encrypting the encryption key using a public key to generate an encrypted encryption key and transmitting the encrypted encryption key to the remote communication device.

7. The method of claim 1 further comprising repeating the applying of the deterministic algorithm to generate the further hash, using the further hash as an encryption key to encrypt a further batch of the data and transmitting the encrypted further batch of the data, for all further batches of the data associated with the data item.

8. The method of claim 1 further comprising, after transmitting the encrypted first batch of the data, receiving a request for additional data associated with the data item from the remote communication device.

9. The method of claim 1 where the encryption key is a session key.

10. A system for generating a reproducible encryption key for encrypting data in a data item for transmission to a remote communication device, comprising a data processing device in communication with at least one memory storing the data item and comprising a processor configured to apply a deterministic algorithm to at least a portion of the data item to generate a first hash for use as an encryption key associated with the data item for transmission of a first batch of data to the communication device, the data item exceeding a selected batch size, the processor further configured to encrypt a plurality of batches of data with a further encryption key generated by re-applying the deterministic algorithm to at least a portion of the data item to thereby reproduce the further encryption key and to encrypt each of the plurality of batches of data with the further encryption key, and to transmit each of the encrypted plurality of batches of data to a remote communication device whereby the encryption key is identical to the further encryption key.

11. The system of claim 10 wherein the deterministic algorithm comprises a hash algorithm.

12. The system of claim 10 wherein the deterministic algorithm comprises a key derivation function.

13. The system of claim 10 wherein the processor further concatenates the portion of the data item with additional data prior to applying the deterministic algorithm.

14. The system of claim 13 wherein the additional data is from a source external to the data item.

15. The system of claim 10 wherein the processor further encrypts the encryption key using a public key to generate an encrypted encryption key.

16. A computer program product for use with a computer, the computer program product comprising a non-transitory computer usable medium having computer readable program code means embodied in said medium for generating a reproducible encryption key for encrypting message data, said computer program product having:

computer readable program code means for applying a deterministic algorithm to at least a portion of the data item to generate a first hash for use as a encryption key to encrypt a first batch of the data associated with the data item; and computer readable program code means for transmitting the encrypted first batch of the data associated with the data item to the communication device, and if the data item exceeds a selected batch size, a plurality of batches of data are encrypted with a further encryption key generated by re-applying the deterministic algorithm to at least a portion of the data item to thereby reproduce the further encryption key and encrypting each of the plurality of batches of data with the further encryption key, and transmitted to the remote communication device whereby the encryption key is identical to the further encryption key.

17. The computer program product of claim 16 wherein the deterministic algorithm comprises a hash algorithm.

18. The computer program product of claim 16 wherein the deterministic algorithm comprises a key derivation function.

19. The computer program product of claim 16, further comprising computer readable program code means for concatenating the portion of the data item with additional data prior to applying the deterministic algorithm.

20. The computer program product of claim 19 wherein the additional data is from a source external to the data item.

21. The computer program product of claim 16, further comprising computer readable program code means for encrypting the encryption key using a public key to generate an encrypted encryption key.

* * * * *